United States Patent
Yang et al.

(10) Patent No.: US 12,375,154 B2
(45) Date of Patent: Jul. 29, 2025

(54) BEAM FAILURE RECOVERY METHOD, TERMINAL, AND NETWORK DEVICE

(71) Applicant: VIVO MOBILE COMMUNICATION CO., LTD., Guangdong (CN)

(72) Inventors: Yu Yang, Guangdong (CN); Peng Sun, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 441 days.

(21) Appl. No.: 17/882,281

(22) Filed: Aug. 5, 2022

(65) Prior Publication Data

US 2022/0377586 A1 Nov. 24, 2022

Related U.S. Application Data

(63) Continuation of application No. PCT/CN2021/075004, filed on Feb. 3, 2021.

(30) Foreign Application Priority Data

Feb. 7, 2020 (CN) .......................... 202010082906.8

(51) Int. Cl.
*H04W 24/08* (2009.01)
*H04L 5/00* (2006.01)

(52) U.S. Cl.
CPC ........... *H04W 24/08* (2013.01); *H04L 5/0048* (2013.01)

(58) Field of Classification Search
CPC ..... H04W 24/08; H04W 72/21; H04W 74/04; H04W 74/0833; H04W 74/0838; H04W 24/04; H04W 72/046; H04W 74/002; H04L 5/0048; H04B 7/0695; H04B 7/0408; H04B 7/0617

See application file for complete search history.

(56) References Cited

U.S. PATENT DOCUMENTS

| | | |
|---|---|---|
| 2019/0215048 A1 | 7/2019 | Cirik |
| 2021/0067231 A1 | 3/2021 | Yang |
| 2021/0153074 A1 | 5/2021 | Yang et al. |

(Continued)

FOREIGN PATENT DOCUMENTS

| | | |
|---|---|---|
| CN | 110719154 A | 1/2020 |
| CN | 112204899 A | 1/2021 |

(Continued)

OTHER PUBLICATIONS

Extended European Search Report for Application No. 21751453.8-1216, dated Jun. 13, 2023, 13 Pages.

(Continued)

*Primary Examiner* — Habte Mered
(74) *Attorney, Agent, or Firm* — BROOKS KUSHMAN P.C.

(57) ABSTRACT

Embodiments of the present invention provide a beam failure recovery method, a terminal, and a network device, where the beam failure recovery method includes: measuring a BFD RS; where the BFD RS corresponds to a plurality of pieces of first object information, and the first object information includes at least one of the following: a TRP identifier, CORESETPoolIndex information, a group identifier, a cell identity, and a PCI; determining a target event based on a measurement result of the BFD RS; and sending BFRQ information.

20 Claims, 4 Drawing Sheets

(56) References Cited

U.S. PATENT DOCUMENTS

2021/0282168 A1* 9/2021 Matsumura ........... H04L 5/0048
2022/0295589 A1* 9/2022 Tsai ..................... H04B 17/309

FOREIGN PATENT DOCUMENTS

| CN | 112673579 A | 4/2021 |
| --- | --- | --- |
| CN | 115606105 A | 1/2023 |
| JP | 2022545406 A | 10/2022 |
| WO | 2019218910 A1 | 11/2019 |
| WO | 2019233352 A1 | 12/2019 |
| WO | 2020012619 A1 | 1/2020 |
| WO | 2020024803 A1 | 2/2020 |
| WO | 2021034672 A1 | 2/2021 |

OTHER PUBLICATIONS

Spreadtrum Communications "Discussion on multi-beam operation" 3GPP TSG RAN WG1 Meeting #95, Spokane, USA, Nov. 2018, R1-1813067, 5 Pages.

First Office Action for Japanese Application No. 2022-548048, dated Aug. 14, 2023, 11 Pages.

AT&T "On beam recovery for partial and full control channel failure" 3GPP TSG RAN WG1 Meeting NR#3, Nagoya, Japan, Sep. 2017, R1-1716169, 7 Pages.

Convida Wireless "On Beam Failure Recovery for SCell" 3GPP TSG-RAN WG1 #98bis, Chongqing, China, Oct. 2019, R1-1911006, 7 Pages.

First Office Action for Korean Application No. 10-2022-7030605, dated Aug. 20, 2024, 6 Pages.

Intel Corporation "Discussion on multi-beam enhancements" 3GPP TSG RAN WG1 #98, Prague, CZ, Aug. 2019, R1-1908654, 16 Pages.

ZTE "Enhancements on multi-beam operation" 3GPP TSG RAN WG1 Meeting #99, Reno, USA, Nov. 2019, R1-1911931, 18 Pages.

First Office Action for Chinese Application No. 202010082906.8, dated May 13, 2022, 8 Pages.

International Search Report and Written Opinion for Application No. PCT/CN2021/075004, dated Apr. 29, 2021, 6 Pages.

Mediatek Inc., "Enhancements on Multi-beam Operations," 3GPP TSG RAN WG1 #99, Agenda item 7.2.8.3, Nov. 18-22, 2019, R1-1912135, Reno, Nevada, USA, 10 Pages.

* cited by examiner

BEAM FAILURE RECOVERY METHOD, TERMINAL, AND NETWORK DEVICE

CROSS-REFERENCE TO RELATED APPLICATIONS

This application is a continuation of International Application No. PCT/CN2021/075004 filed on Feb. 3, 2021, which claims priority to Chinese Patent Application No. 202010082906.8, filed on Feb. 7, 2020, which are incorporated herein by reference in their entireties.

TECHNICAL FIELD

The present invention relates to the field of communications technologies, and in particular, to a beam failure recovery method, a terminal, and a network device.

BACKGROUND

In a multiple transmission reception point (Transmission Reception Point, TRP) scenario, when channel quality is degraded due to blocking of beams of one or more TRPs, a corresponding beam failure recovery mechanism needs to be introduced. However, in the prior art, it is still unclear how a beam failure event is determined in the multi-TRP scenario, so that beam failure recovery cannot be implemented.

SUMMARY

Embodiments of the present invention provide a beam failure recovery method, a terminal, and a network device.

According to a first aspect, an embodiment of the present invention provides a beam failure recovery method, applied to a terminal and including:

measuring a BFD RS, where the BFD RS corresponds to a plurality of pieces of first object information, and the first object information includes at least one of the following: a transmission and reception point TRP identifier, CORESET-PoolIndex information, a group identifier, a cell identity, and a PCI;

determining a target event based on a measurement result of the BFD RS; and sending BFRQ information.

According to a second aspect, an embodiment of the present invention provides a beam failure recovery method, applied to a network device and including:

receiving BFRQ information sent by a terminal; where the BFRQ information is sent after the terminal determines a target event based on measurement results of BFD RSs, the BFD RS corresponds to a plurality of pieces of first object information, and the first object information includes at least one of the following: a TRP identifier, CORESET-PoolIndex information, a group identifier, a cell identity, and a PCI.

According to a third aspect, an embodiment of the present invention provides a terminal, including:

a measurement module, configured to measure a BFD RS, where the BFD RS corresponds to a plurality of pieces of first object information, and the first object information includes at least one of the following: a transmission and reception point TRP identifier, CORESETPoolIndex information, a group identifier, a cell identity, and a PCI;

a first determining module, configured to determine a target event based on a measurement result of the BFD RS; and a first sending module, configured to send BFRQ information.

According to a fourth aspect, an embodiment of the present invention provides a network device, including:

a third receiving module, configured to receive BFRQ information sent by a terminal; where the BFRQ information is sent after the terminal determines a target event based on measurement results of BFD RSs, the BFD RS corresponds to a plurality of pieces of first object information, and the first object information includes at least one of the following: a TRP identifier, CORESET-PoolIndex information, a group identifier, a cell identity, and a PCI.

According to a fifth aspect, an embodiment of the present invention provides a communications device, including a memory, a processor, and a computer program stored in the memory and capable of running on the processor. When the computer program is executed by the processor, the steps of the beam failure recovery method can be implemented. Optionally, the communications device may be a terminal or a network device.

According to a sixth aspect, an embodiment of the present invention provides a computer-readable storage medium, where a computer program is stored in the computer-readable storage medium, and when the computer program is executed by a processor, the steps of the beam failure recovery method can be implemented.

According to a seventh aspect, an embodiment of the present invention provides a computer software product, where the computer software product is stored in a non-volatile storage medium, and the software product is configured to implement the steps of the beam failure recovery method when being executed by at least one processor.

According to an eighth aspect, an embodiment of the present invention provides a communications device, where the communications device is configured to execute the foregoing beam failure recovery method.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may derive other drawings from these accompanying drawings.

DETAILED DESCRIPTION OF EMBODIMENTS

Figure 1:
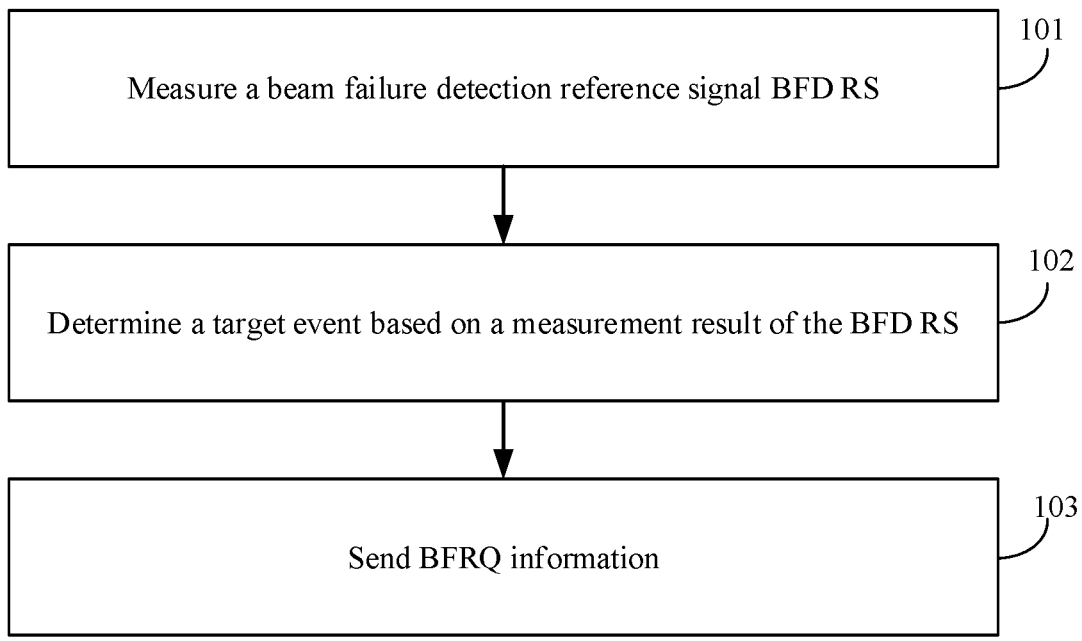
FIG. 1 is a flowchart of a beam failure recovery method according to an embodiment of the present invention.

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may derive other drawings from these accompanying drawings.

Optionally, a wireless communications system in the embodiments of the present invention includes a terminal and a network device. The terminal may also be referred to as a terminal device or user equipment (User Equipment, UE). The terminal may be a terminal-side device such as a mobile phone, a tablet computer (Tablet Personal Computer), a laptop computer (Laptop Computer), a personal digital assistant (Personal Digital Assistant, PDA), a mobile Internet device (Mobile Internet Device, MID), a wearable device (Wearable Device), or an in-vehicle device. It should be noted that a specific type of the terminal is not limited in the embodiments of the present invention. The network device may be a base station or a core network. The base station may be a fifth-generation ($5^{th}$ Generation, 5G) or later-version base station (for example, a gNB or a 5G NR NB), or a base station in another communications system (for example, an eNB, a wireless local area network (Wireless Local Area Network, WLAN) access point, or another access point). The base station may be referred to as a NodeB, an evolved NodeB, an access point, a base transceiver station (Base Transceiver Station, BTS), a radio base station, a radio transceiver, a basic service set (Basic Service Set, BSS), an extended service set (Extended Service Set, ESS), a NodeB, an evolved NodeB (eNB), a home NodeB, a home evolved NodeB, a WLAN access point, a Wi-Fi (Wireless Fidelity, WiFi) node, or another appropriate term in the art. As long as a same technical effect is achieved, the base station is not limited to a specific technical term.

Optionally, the embodiments of the present invention are applicable to a multi-carrier scenario. The multi-carrier scenario may be construed as carrier aggregation (Carrier Aggregation, CA), and there are multiple carriers (carrier), or multiple component carriers CCs, or multiple cells. Specifically, there is a primary cell (such as a PCell (Primary cell) in an MCG (master cell group), or a PSCell (Primary secondary cell) in an SCG (secondary cell group)) and at least one secondary cell SCell (Secondary cell).

It should be noted that beam information, spatial relation (spatial relation) information, spatial domain transmission filter (spatial domain transmission filter) information, transmission configuration indication (Transmission configuration indication, TCI) state (state) information, antenna quasi-colocation (Quasi-co-location, QCL) information, and QCL parameter in the embodiments of the present invention have approximately the same meaning. Downlink beam information may be usually represented by TCI state information, QCL information, or the like. Uplink beam information may be usually represented by using spatial relation information.

In the embodiments of the present invention, first object information may include at least one of the following: TRP identifier, CORESETPoolIndex information, group identifier, cell identity (Cell ID), physical cell identifier (Physical Cell ID, PCI), and the like. Second object information may include at least one of the following: all TRP identifiers, all CORESETPoolIndex information, all group identifiers, all Cell IDs, all PCIs, and the like. Target object information may include at least one of the following: a target TRP identifier, target CORESETPoolIndex information, a target group identifier, a target cell ID, a target PCI, and the like. It can be understood that content included in the first object information, the second object information, and the target object information in the following embodiments may be specifically as described above, and details are not described below again.

The present invention is described in detail below with reference to the embodiments and the accompanying drawings.

Referring to FIG. 1, FIG. 1 is a flowchart of a beam failure recovery method according to an embodiment of the present invention. The method is applied to a terminal. As shown in FIG. 1, the method includes the following steps.

Step 101: Measure a beam failure detection reference signal BFD RS.

In this embodiment, the beam failure detection reference signal (Beam Failure Detection Reference Signal, BFD RS) corresponds to a plurality of pieces of first object information. Optionally, the BFD RS may explicitly correspond to the plurality of pieces of first object information, which is, for example, indicated by using signaling; or may implicitly correspond to the plurality of pieces of first object information, for example, according to a preset rule (for example, a preset correspondence between RS resource indexes and first object information).

In an explicit corresponding manner, when a network device configures a BFD RS for the terminal, a new parameter is added to configuration information of a BFD RS resource to indicate first object information, for example, CORESETPoolIndex is added. For example, if the network is configured with four BFD RS resources, and BFD RS1 and BFD RS2 are used for measurement of TRP1, CORESETPoolIndex=0 is added to resource configuration of BFD RS1 and BFD RS2. Similarly, if BFD RS3 and BFD RS4 are used for measurement of TRP2, CORESETPoolIndex=1 is added to resource configuration of BFD RS3 and BFD RS4.

In an implicit corresponding manner, the BFD RS corresponds to different TRPs according to a preset rule based on an index order of BFD RS resources configured by the network. For example, the network configures four BFD RS resources, where BFD RS1 and BFD RS2 are used for measurement of TRP1, and BFD RS3 and BFD RS4 are used for measurement of TRP2.

In another implicit corresponding manner, based on beam information (such as TCI state or QCL information) of the BFD RS resources configured by the network, BFD RS resources with same beam information correspond to a same TRP. For example, the network configures four BFD RS resources, where BFD RS1 and BFD RS2 have same beam information and are used for measurement of TRP1, and BFD RS3 and BFD RS4 have same beam information and are used for measurement of TRP2.

The measurement of the BFD RS may be used for beam failure detection (Beam Failure Detection, BFD) in a multi-TRP scenario.

Certainly, if one physical cell corresponds to one TRP, when TRP identification information is required, a PCI may be used for obtaining a TRP identifier. For example, the PCI is used in the configuration information, so as to obtain corresponding TRP identification information. If one physical cell corresponds to a plurality of TRPs, the TRP identifiers cannot be obtained based on only a PCI, but based on a combination of a PCI and TRP identifier, or by using other identification information such as a cell index.

In an optional implementation, the foregoing BFD RS may be configured by the network. Further, the BFD RS configured by the network may correspond to one TRP or a plurality of TRPs. The BFD RS configured by the network may be used for BFD of a primary cell, BFD of a secondary cell, or BFD of a plurality of cells.

Step 102: Determine a target event based on a measurement result of the BFD RS.

The target event may be understood as a beam failure event. After determining the target event, the terminal may initiate a beam failure recovery process, for example, sending beam failure recovery request (Beam Failure Recovery reQuest, BFRQ) information and monitoring beam failure recovery response (Beam Failure Recovery Response, BFRR) information.

Step 103: Send BFRQ information.

In the beam failure recovery method in this embodiment of the present invention, the BFD RS is measured, and the BFD RS corresponds to a plurality of pieces of first object information. The target event is determined based on the measurement result of the BFD RS, and then the BFRQ information is sent, so as to determine a beam failure event in the multi-TRP scenario and quickly recover an interrupted beam link, thereby improving reliability of data transmission.

In this embodiment of the present invention, the target event determined by the terminal based on the measurement result of the BFD RS may be classified into at least the following three cases, which are separately described as follows:

Case 1:

In case 1, the target event is that measurement results of all BFD RSs corresponding to a primary cell satisfy a first preset condition. For example, the first preset condition is that the measurement results of all the BFD RSs (for example, L1-RSRP or L1-SINR) corresponding to the primary cell are less than a preset threshold, that is, a beam is blocked and channel quality is degraded. Further, using the measured BFD RS corresponding to a plurality of TRPs as an example, the target event can be understood as that all TRPs in the plurality of TRPs have a beam failure in the primary cell, that is, the beam failure in the primary cell is detected and determined on all the TRPs.

Optionally, in case 1, the process of sending the BFRQ information may include:

(1) sending the BFRQ information by using a contention-free random access (Random Access, RACH) resource; or, (2) sending the BFRQ information by using a contention-based RACH resource.

For the foregoing (1), the terminal may send the BFRQ information by using the contention-free RACH resource in a case that a preset condition (for example, the network has configured a contention-free RACH resource and a control resource set (Control Resource Set, CORESET) for beam failure recovery) is satisfied.

In an optional implementation, the process of sending the BFRQ information by the terminal by using the contention-free RACH resource may include: determining a target RACH resource; and determining, based on a correspondence between RACH resources and first object information, target object information corresponding to the target RACH resource, and sending the BFRQ information based on the target object information. The sending the BFRQ information based on the target object information may be understood as: sending the BFRQ information to a target object corresponding to the target object information.

For example, using the first object information including a TRP identifier as an example, after determining the target RACH resource, the terminal may determine, based on a correspondence between RACH resources and TRP identifiers, a target TRP identifier corresponding to the target RACH resource, and send the BFRQ information to a target TRP corresponding to the target TRP identifier.

For another example, using the first object information including a physical cell identifier PCI as an example, after determining the target RACH resource, the terminal may determine, based on a correspondence between RACH resources and PCIs, a target PCI corresponding to the target RACH resource, and send the BFRQ information to a TRP corresponding to the target PCI. It should be noted that if the target PCI corresponds to one TRP, the BFRQ information may be directly sent to the TRP. However, if the target PCI corresponds to a plurality of TRPs, a target TRP needs to be further selected based on a corresponding TRP identifier and then the BFRQ information is sent.

Further, the process of determining the target RACH resource may include:

measuring candidate beam (candidate beam) reference signals (Reference Signal, RS), and determining a target RS based on measurement results of the candidate beam RSs; and determining, based on a correspondence between candidate beam RSs and RACH resources, the target RACH resource corresponding to the target RS; or selecting the target RACH resource based on the target RS, where the target RS and the target RACH resource correspond to same first object information, for example, the target RS and the target RACH resource correspond to a same TRP identifier, cell identity, and/or PCI.

It should be noted that the candidate beam RS may be a synchronization signal and a PBCH block (Synchronization Signal and PBCH block, SSB) or a channel state information reference signal (Channel State Information Reference Signal, CSI-RS) in a cell or a physical cell other than a current serving cell. The target RS may be an SSB or a CSI-RS. A beam corresponding to the target RS can be construed as a new beam. For example, after determining the target RS, the terminal may further determine, based on an association relationship between candidate beam RSs and RACH resources, an RACH resource corresponding to the target RS as the target RACH resource.

Optionally, configuration information of the candidate beam RSs includes: a correspondence between candidate beam RSs and first object information. For example, the configuration information of the candidate beam RSs includes: a correspondence between candidate beam RSs and cell indexes, a correspondence between candidate beam RSs and PCIs, and/or a correspondence between candidate beam RSs and TRP identifiers.

Optionally, RACH resource configuration information of the terminal includes: a correspondence between RACH resources and first object information. For example, the RACH resource configuration information includes: a correspondence between RACH resources and cell indexes, a correspondence between RACH resources and PCIs, and/or a correspondence between RACH resources and TRP identifiers.

Optionally, when the first object information is one of a TRP identifier, CORESETPoolIndex information, and a group identifier, the plurality of pieces of first object information is any one of the following cases:

belonging to a plurality of cells or a same cell; and belonging to a plurality of physical cells or a same physical cell.

In an optional implementation, after sending the BFRQ information by using the contention-free RACH resource, the terminal may further perform the following operations:

(1) if one control resource set CORESET (which may be referred to as CORESET-BFR) for beam failure recovery (beam failure recovery, BFR) is configured (by the network), monitoring BFRR information on the CORESET, where the CORESET has same QCL information as the target RS; and (2) if a plurality of CORESETs for BFR are configured (by the network), monitoring BFRR information on a CORESET that corresponds to same target object information as the target RACH resource, or monitoring BFRR information on a CORESET that corresponds to same target object information as the target RS.

For example, the case of (1) is applied to an ideal backhaul (backhaul) scenario, and the case of (2) is applied to a non-ideal backhaul (backhaul) scenario.

The monitoring BFRR information on a CORESET that corresponds to same target object information as the target RACH resource may be understood as: monitoring BFRR information of a corresponding CORESET on a target object corresponding to the target RACH resource. For example, using the target object information being the target TRP identifier as an example, the terminal may monitor the BFRR information of the corresponding CORESET on a target TRP corresponding to the target RACH resource. For another example, using the target object information being the target cell index as an example, the terminal may monitor the BFRR information of the corresponding CORESET on a target cell corresponding to the target RACH resource. For another example, using the target object information being the target PCI as an example, the terminal may monitor the BFRR information of the corresponding CORESET on a target physical cell corresponding to the target RACH resource.

The monitoring BFRR information on a CORESET that corresponds to same target object information as the target RS may be understood as: monitoring BFRR information of a corresponding CORESET on a target object corresponding to the target RS. For example, using the target object information being the target TRP identifier as an example, the terminal may monitor the BFRR information of the corresponding CORESET on a target TRP corresponding to the target RS. For another example, using the target object information being the target cell index as an example, the terminal may monitor the BFRR information of the corresponding CORESET on a target cell corresponding to the target RS. For another example, using the target object information being the target PCI as an example, the terminal may monitor the BFRR information of the corresponding CORESET on a target physical cell corresponding to the target RS.

In an optional implementation, beam information of other channels may be reset in the case that the terminal sends the BFRQ information by using the contention-free RACH resource. A specific resetting process may be as follows:

(a) Determine, based on the beam information of the target RACH resource, beam information (which is transmit beam information) of a physical uplink control channel (Physical Uplink Control Channel, PUCCH) corresponding to the target object information or second object information.

For example, using the target object information being a target cell index as an example, the UE may determine, based on the beam information of the target RACH resource, transmit beam information of a PUCCH on a target cell corresponding to the target cell index. Alternatively, using the target object information being a target PCI as an example, the UE may determine, based on the beam information of the target RACH resource, transmit beam information of a PUCCH on a target physical cell corresponding to the target PCI. Alternatively, using the target object information being a target TRP identifier as an example, the UE may determine, based on the beam information of the target RACH resource, transmit beam information of a PUCCH on a target TRP corresponding to the target TRP identifier.

For another example, the UE may determine transmit beam information of PUCCHs on all cells, all physical cells, or all TRPs based on the beam information of the target RACH resource.

(b) Based on the target RS, determine beam information of a physical downlink control channel (Physical Downlink Control Channel, PDCCH) corresponding to the target object information or the second object information; and/or determine beam information (that is, receive beam information) of a physical downlink shared channel (Physical Downlink Shared Channel, PDSCH) corresponding to the target object information or the second object information.

For example, using the target object information being a target cell index as an example, the UE may determine, based on the target RS, beam information of a PDCCH on a target cell corresponding to the target cell index, and/or determine beam information of a PDSCH scheduled by using downlink control information (Downlink Control Information, DCI) on a target cell corresponding to the target cell index. Alternatively, using the target object information being a target PCI as an example, the UE may determine, based on the target RS, beam information of a PDCCH on a target physical cell corresponding to the target PCI, and/or determine beam information of a PDSCH scheduled by using DCI on a target physical cell corresponding to the target PCI. Alternatively, using the target object information being a target TRP identifier as an example, the UE may determine, based on the target RS, beam information of a PDCCH on a target TRP corresponding to the target TRP identifier, and/or determine beam information of a PDSCH scheduled by using DCI on a target TRP corresponding to the target TRP identifier.

For another example, the UE may determine, based on the target RS, beam information of PDCCHs on all cells, all physical cells, or all TRPs, and/or determine beam information of PDSCHs scheduled by DCI on all cells, all physical cells, or all TRPs.

It should be noted that in a non-ideal backhaul scenario, the beam information of the PDSCH (such as the PDSCH on the target cell, the target physical cell and/or the target TRP) corresponding to the target object information does not need to be reset along with the target RS, and may be reconfigured by the network.

Optionally, the beam information determined in the foregoing resetting process may start at a time with an offset of a preset quantity (for example, K) of symbols after a time of reception of the BFRR information; and correspondingly ends at a time of reception of reconfiguration information, activation information, or indication information of the determined beam information.

Optionally, a handover process may be performed in the case that the terminal sends the BFRQ information by using the contention-free RACH resource. The specific handover process may include at least one of the following:

I. monitoring CORESET #0 based on target object information, for example, the UE is handed over to the target cell, the target physical cell, or the target TRP to monitor CORESET #0;

II. changing an anchor (anchor) object based on the target object information, for example, the UE changes the anchor TRP to the target cell, the target physical cell, or the target TRP; and III. based on CORESETPoolIndex information corresponding to the target object information, updating CORESETPoolIndex information corresponding to a CORESET that has been configured. For example, CORESETPoolIndex information configured in other CORESETs is changed to CORESETPoolIndex information corresponding to the target cell, the target physical cell, or the target TRP. For example, if CORESETPoolIndex information corresponding to a configured CORESET is 1, and CORESETPoolIndex information corresponding to the target TRP identifier is 2, the CORESETPoolIndex information corresponding to the configured CORESET may be updated from 1 to 2.

For the foregoing (2), the terminal may send the BFRQ information by using the contention-based RACH resource in a case that a preset condition is satisfied (for example, a contention-free RACH resource is not configured).

In an optional implementation, the process of sending the BFRQ information by the terminal by using the contention-based RACH resource may include: determining a target RACH resource; and determining, based on a correspondence between RACH resources and first object information, target object information corresponding to the target RACH resource, and sending the BFRQ information based on the target object information. The sending the BFRQ information based on the target object information may be understood as: sending the BFRQ information to a target object corresponding to the target object information.

For example, using the first object information including a TRP identifier as an example, after determining the target RACH resource, the terminal may determine, based on a correspondence between RACH resources and TRP identifiers, a target TRP identifier corresponding to the target RACH resource, and send the BFRQ information to a target TRP corresponding to the target TRP identifier.

For another example, using the first object information including a PCI as an example, after determining the target RACH resource, the terminal may determine, based on a correspondence between RACH resources and PCIs, a target PCI corresponding to the target RACH resource, and send the BFRQ information to a TRP corresponding to the target PCI. It should be noted that if the target PCI corresponds to one TRP, the BFRQ information may be directly sent to the TRP. However, if the target PCI corresponds to a plurality of TRPs, a target TRP needs to be further selected based on a corresponding TRP identifier and then the BFRQ information is sent.

Further, the process of determining the target RACH resource may include:

determining a target SSB based on terminal measurement; and determining, based on a correspondence between SSBs and RACH resources (for example, contention-based RACH resources), the target RACH resource corresponding to the target SSB, that is, determining the RACH resource corresponding to the target SSB as the target RACH resource; or selecting the target RACH resource based on the target SSB, where the target SSB and the target RACH resource correspond to same first object information, for example, the target SSB and the target RACH resource correspond to a same TRP identifier, cell identity, and/or PCI.

Optionally, the resource configuration information of the terminal includes at least one of the following:

a correspondence between SSBs and first object information; for example, the correspondence between SSBs and first object information is optionally: a correspondence between SSBs and cell indexes, a correspondence between SSBs and PCIs, or a correspondence between SSBs and TRP identifiers; and a correspondence between RACH resources and first object information; for example, the correspondence between RACH resources and first object information is optionally: a correspondence between RACH resources and cell indexes, a correspondence between RACH resources and PCIs, or a correspondence between RACH resources and TRP identifiers.

In an implementation, the resource configuration information may be sent to the terminal by the network by using radio resource control (Radio Resource Control, RRC) signaling.

Optionally, when the first object information is one of a TRP identifier, CORESETPoolIndex information, and a group identifier, the plurality of pieces of first object information is any one of the following cases:

belonging to a plurality of cells or a same cell; and belonging to a plurality of physical cells or a same physical cell.

In an optional implementation, after sending the BFRQ information by using the contention-based RACH resource, the terminal may monitor the BFRR information on CORESET #0. QCL information of CORESET #0 may be determined based on information of the target RACH resource. A time for monitoring the BFRR information may be after a preset time T elapses since the terminal sends the BFRQ information, or within a random access response window (RAR window).

In an optional implementation, beam information of other channels may be reset in the case that the terminal sends the BFRQ information by using the contention-based RACH resource. A specific resetting process may be as follows:

based on the target SSB, determining beam information of a channel corresponding to the target object information or second object information, and/or determining beam information of an RS corresponding to the target object information or second object information.

For example, using the target object information being a target cell index as an example, the UE may determine, based on the target SSB, beam information of a channel on a target cell corresponding to the target cell index, and/or determine beam information of an RS on a target cell corresponding to the target cell index. Alternatively, using the target object information being a target PCI as an example, the UE may determine, based on the target SSB, beam information of a channel on a target physical cell corresponding to the target PCI, and/or determine beam information of an RS on a target physical cell corresponding to the target PCI. Alternatively, using the target object information being a target TRP identifier as an example, the UE may determine, based on the target SSB, beam information of a channel on a target TRP corresponding to the target TRP identifier, and/or determine beam information of an RS on a target TRP corresponding to the target TRP identifier.

For another example, the UE may determine, based on the target SSB, beam information of channels on all cells, all physical cells, or all TRPs, and/or determine beam information of RSs on all cells, all physical cells, or all TRPs.

It should be noted that, in addition to the foregoing resetting case, a channel corresponding to the target object information or the second object information may still use originally configured beam information.

Optionally, the beam information determined in the foregoing resetting process may start at a time with an offset of a preset quantity (for example, K) of symbols after a time of reception of the BFRR information; and correspondingly ends at a time of reception of reconfiguration information, activation information, or indication information of the determined beam information.

Optionally, a handover process may be performed in the case that the terminal sends the BFRQ information by using the contention-based RACH resource. The specific handover process may include at least one of the following:

I. monitoring CORESET #0 based on target object information, for example, the UE is handed over to the target cell, the target physical cell, or the target TRP to monitor CORESET #0;

II. changing an anchor (anchor) object based on the target object information, for example, the UE changes the anchor TRP to the target cell, the target physical cell, or the target TRP; and III. based on CORESETPoolIndex information corresponding to the target object information, updating CORESETPoolIndex information corresponding to a CORESET that has been configured. For example, CORESETPoolIndex information configured in other CORESETs is changed to CORESETPoolIndex information corresponding to the target cell, the target physical cell, or the target TRP.

Case 2:

In case 2, the target event is that measurement results of all BFD RSs corresponding to a secondary cell satisfy a second preset condition. For example, the second preset condition is that the measurement results of all the BFD RSs corresponding to the secondary cell are less than a preset threshold, that is, a beam is blocked and channel quality is degraded. Further, using the measured BFD RS corresponding to a plurality of TRPs as an example, the target event can be understood as that all TRPs in the plurality of TRPs have a beam failure in the secondary cell, that is, the beam failure in one or more secondary cells is detected and determined on all the TRPs.

Optionally, in case 2, the process of sending the BFRQ information may include:

when there is an available uplink grant (UL grant), sending the BFRQ information by using the uplink grant, where, for example, the BFRQ information may be carried by a media access control control element (Media Access Control Control Element, MAC CE), that is, being sent by using the MAC CE; or when there is no available uplink grant, sending the BFRQ information by using an uplink grant requested from a network.

In an optional implementation, when there is an available uplink grant, the uplink grant corresponds to any one piece of first object information. For example, the uplink grant corresponds to a grant of any one TRP identifier; or the uplink grant corresponds to a grant of any one group identifier; or the uplink grant corresponds to a grant of any one PCI. That is, the terminal may send the BFRQ information by using an uplink grant of any first object.

In an optional implementation, when there is no available uplink grant, the foregoing process of sending the BFRQ information by using an uplink grant requested from a network may include: sending a scheduling request (Scheduling Request, SR); and receiving a response sent by the network, and sending the BFRQ information by using an uplink grant indicated by the response.

Optionally, the SR and the response correspond to same or different first object information (such as a cell index, a TRP identifier, or a PCI). That is, the SR and the response may correspond to different network nodes. For example, the SR corresponds to a TRP1 and the response corresponds to a TRP2.

Optionally, the response may be new scheduling information indicated by the network.

Further, the SR may be carried by a PUCCH-BFR. A manner of sending the SR may include any one of the following:

(1) Determining Third Object Information Based on a First Correspondence, and Sending the SR Based on the Third Object Information.

In (1), the first correspondence may be included in the configuration information of the terminal. The first correspondence may include any one of the following:

a correspondence between first object information and SR configuration information, for example, a correspondence between TRP identifiers (or cell indexes, or PCIs) and SR configuration information;

a correspondence between first object information and PUCCH resources for BFR in SR configuration information, for example, a correspondence between TRP identifiers (or cell indexes, or PCIs) and PUCCH resources for BFR in SR configuration information; and a correspondence between first object information and spatial relation (spatial relation) information of PUCCH resources for BFR in SR configuration information, for example, a correspondence between TRP identifiers (or cell indexes, or PCIs) and spatial relation information of PUCCH resources for BFR in SR configuration information.

For example, the first object information being a TRP identifier is used as an example. Based on a correspondence between network-configured TRP identifiers and SR configuration information (for example, a correspondence between SR config and CORESETPoolIndex), the terminal may send the SR to a TRP corresponding to a TRP identifier that is corresponding to the SR; or, based on a correspondence between TRP identifiers and PUCCH resources for BFR in SR configuration information (for example, a correspondence between PUCCH resources in SR config and CORESETPoolIndex), the terminal may send the SR to a TRP corresponding to a TRP identifier that is corresponding to a PUCCH resource in use; or, based on a correspondence between TRP identifiers and spatial relation information of PUCCH resources for BFR in SR configuration information (for example, a correspondence between spatial relations of PUCCH resources in SR config and CORESETPoolIndex), the terminal may send the SR to a TRP corresponding to a TRP identifier that is corresponding to a spatial relation of a PUCCH resource in use.

(2) Sending the SR Based on any One of the First Object Information.

For example, the terminal may send the SR based on any one cell index, or may send the SR based on any one PCI, or may send the SR based on any one TRP identifier.

(3) Sending the SR Simultaneously or in Turn Based on the Plurality of Pieces of First Object Information.

For example, the terminal may send the SR simultaneously or in turn based on a plurality of cell indexes, or may send the SR simultaneously or in turn based on a plurality of PCIs, or may send the SR simultaneously or in turn based on a plurality of TRP identifiers.

Further, if no SR is configured or the number of times of sending a configured SR reaches a preset threshold, the process of sending the BFRQ information by using an uplink grant requested from a network may include: requesting the uplink grant from the network by using a contention-based RACH resource on a primary cell, and sending the BFRQ information by using the requested uplink grant.

Optionally, the contention-based RACH resource may be determined based on a correspondence between SSBs and contention-based RACH resources after the terminal determines a target SSB through terminal measurement. The contention-based RACH resource and the target SSB correspond to same first object information. For example, the contention-based RACH resource and the target SSB correspond to a same cell index, PCI, or TRP identifier.

In an implementation, the terminal may request an uplink grant from the network by using only a RACH resource of a TRP on the primary cell, that is, requesting the uplink grant from a TRP configured with a primary cell.

As an optional implementation, after sending the BFRQ information, the terminal may further receive BFRR information. The BFRQ information and the BFRR information correspond to same or different first object information. For example, the BFRQ information and the BFRR information correspond to same or different cell indexes, PCIs, or TRP identifiers. The BFRQ information may include at least one of a cell index for a beam failure, a PCI for a beam failure, a TRP identifier for a beam failure, and an identified new beam RS. In addition, the information included in the BFRQ information can alternatively be implicitly carried based on a correspondence between identified new beam RSs and cell indexes, PCIs, and/or TRP identifiers.

As an optional implementation, after sending the BFRQ information, the terminal may reset beam information of other channels. A specific resetting process may be as follows:

based on new beam RS information reported in the BFRQ information, determining beam information of a channel corresponding to target object information or second object information.

For example, using the target object information being a target cell index as an example, the UE may determine, based on the new beam RS information, beam information of a channel on a target cell corresponding to the target cell index. Alternatively, using the target object information being a target PCI as an example, the UE may determine, based on the new beam RS information, beam information of a channel on a target physical cell corresponding to the target PCI. Alternatively, using the target object information being a target TRP identifier as an example, the UE may determine, based on the new beam RS information, beam information of a channel on a target TRP corresponding to the target TRP identifier.

For another example, the UE may determine, based on the new beam RS information, beam information of channels on all cells, all physical cells, or all TRPs.

Optionally, the beam information determined in the foregoing resetting process may start at a time with an offset of a preset quantity (for example, K) of symbols after a time of reception of the BFRR information; and correspondingly ends at a time of reception of reconfiguration information, activation information, or indication information of the determined beam information.

Case 3

In case 3, the target event is that measurement results of part of BFD RSs satisfy a third preset condition. The third preset condition is that the measurement results of the part of BFD RSs are less than a preset threshold, that is, a beam is blocked and channel quality is degraded. Further, using the measured BFD RS being corresponding to a plurality of TRPs as an example, the target event may be understood as a beam failure occurring on TRPs corresponding to the part of BFD RSs, while transmission can be still performed properly on TRPs corresponding to other BFD RSs. The beam failure may be a beam failure of a primary cell and/or a beam failure of a secondary cell.

Optionally, in case 3, the process of sending the BFRQ information may include any one of the following:

sending the BFRQ information based on preset object information;

sending the BFRQ information by using a preset resource; and sending the BFRQ information by using a preset resource based on preset object information.

Optionally, the BFRQ information may include at least one of the following: first object information corresponding to the part of BFD RSs, and new beam RS information. The first object information corresponding to the part of BFD RSs may be understood as a TRP identifier, a PCI, and/or a cell index for a beam failure. The new beam RS information may correspond to a TRP with a beam failure or a TRP without beam failure.

Further, the preset object information may be any one of the following:

first object information corresponding to the part of BFD RSs;

first object information other than the first object information corresponding to the part of BFD RSs; and any one of the first object information corresponding to the measured BFD RSs.

It should be noted that the preset object information may be understood as information corresponding to a preset TRP. The sending the BFRQ information based on the preset object information may be understood as sending the BFRQ information to a preset TRP, and the preset TRP may be any one of the following: a TRP with a beam failure, a TRP without beam failure, and any one TRP.

Further, the preset resource may be any one of the following:

a RACH resource, and an uplink resource for transmitting a MAC CE.

In an optional implementation, when the preset resource is a RACH resource, the RACH resource may be determined based on at least one of the following:

a correspondence between RACH resources and first object information;

new beam RS information; and target SSB information.

For example, the network configures a plurality of sets of RACH resources corresponding to respective cell indexes, PCIs, and/or TRP identifiers, and the UE determines a set of to-be-used RACH resources based on preset-TRP related information such as a cell index, PCI, and/or TRP identifier. For another example, the UE determines a to-be-used contention-free RACH resource based on the identified new beam RS information and a correspondence between new beam RSs and RACH resources. For another example, the UE determines a to-be-used contention-based RACH resource based on the measured and determined target SSB information and a correspondence between SSBs and RACH resources.

For another example, the network configures an association relationship between RACH resources and TRPs, and the UE determines TRP information based on the identified new beam RS information or the target SSB information, and then determines the to-be-used RACH resource based on the TRP information.

In an implementation, the UE may send the BFRQ information to the preset TRP by using the determined RACH resource. When sending the BFRQ information by using the RACH resource, the UE needs to notify the network of the TRP information for the beam failure.

In an optional implementation, after sending the BFRQ information by using the RACH resource, the terminal may further perform any one of the following:

receiving BFRR information based on the first object information corresponding to the part of BFD RSs; that is, receiving the BFRR information on the TRP with the beam failure, where the BFRR information may be DCI for scheduling transmission; or receiving BFRR information based on any one piece of first object information corresponding to the measured BFD RSs, that is, receiving the BFRR information on any one TRP, where the BFRR information may be DCI for scheduling transmission.

In an optional implementation, when the preset resource is an uplink resource for transmitting the MAC CE, the process of sending the BFRQ information by using the preset resource may be:

when there is an available uplink grant, sending the BFRQ information by using the uplink grant; that is, sending the MAC CE to a corresponding TRP by using the uplink grant, where the MAC CE includes the BFRQ information; or when there is no available uplink grant, sending the BFRQ information by using an uplink grant requested from a network.

Optionally, when there is an available uplink grant, a priority of a first uplink grant is higher than a priority of a second uplink grant, the first uplink grant corresponds to first object information corresponding to the part of BFD RSs, and the second uplink grant corresponds to first object information other than the first object information corresponding to the part of BFD RSs. That is, when there is an available uplink grant, an available grant of a cell on the TRP with the beam failure has a higher priority than an available grant of a cell on other TRPs.

In an optional implementation, when there is no available uplink grant, the process of sending the BFRQ information by using an uplink grant requested from a network may include:

i. if a PUCCH resource for BFR (which may be referred to as PUCCH-BFR) is configured, sending an SR by using the PUCCH resource for BFR, receiving a response sent by the network, and sending the BFRQ information by using an uplink grant indicated by the response, where the PUCCH resource and the response correspond to same or different first object information; and the uplink grant indicated by the response may be scheduled to any TRP by using DCI.

In (1), the terminal may determine a to-be-used PUCCH-BFR resource based on a network configuration or according to a preset rule. The process of sending an SR by using the PUCCH resource for BFR may include: determining fourth object information based on a second correspondence, and sending the SR by using the PUCCH resource based on the fourth object information.

The second correspondence may include any of the following:

a correspondence between first object information and SR configuration information, for example, a correspondence between TRP identifiers (or cell indexes, or PCIs) and SR configuration information;

a correspondence between first object information and PUCCH resources for BFR in SR configuration information, for example, a correspondence between TRP identifiers (or cell indexes, or PCIs) and PUCCH resources for BFR in SR configuration information; and a correspondence between first object information and spatial relation information of PUCCH resources for BFR in SR configuration information, for example, a correspondence between TRP identifiers (or cell indexes, or PCIs) and spatial relation information of PUCCH resources for BFR in SR configuration information.

It should be noted that the second correspondence may be included in configuration information sent by the network to the terminal. For the correspondence between first object information and SR configuration information, a plurality of pieces of SR configuration information (SR config) may be configured, respectively corresponding to a plurality of TRPs (that is, TRP information). For the correspondence between first object information and PUCCH resources for BFR in SR configuration information, one piece of SR configuration information may be configured to include a plurality of PUCCH resources for BFR (there are a plurality of PUCCH resources in the SR config), respectively corresponding to a plurality of TRPs. For the correspondence between first object information and spatial relation information of PUCCH resources for BFR in SR configuration information, the PUCCH resource used for BFR in the SR configuration information may be configured to include a plurality of pieces of spatial relation information (the PUCCH resource in the SR config has a plurality of spatial relations), respectively corresponding to a plurality of TRPs. In this way, the terminal may choose to use the PUCCH resource for BFR, or use a plurality of PUCCH resources for BFR in a time-division manner, or choose to use, or use in a time-division manner, the spatial relation information of the PUCCH resource; and send the SR to the corresponding TRP based on the foregoing correspondence. However, if the network configures a PUCCH resource group, the UE may select any PUCCH resource in one group to send an SR to a TRP corresponding to the PUCCH resource group.

(2) if no PUCCH resource for BFR is configured, requesting an uplink grant from the network by using a contention-based RACH resource, and sending the BFRQ information by using the requested uplink grant.

In an optional implementation, after sending the BFRQ information by using the MAC CE (that is, the uplink resource for transmitting the MAC CE), the terminal may further perform any one of the following:

receiving BFRR information based on the first object information corresponding to the part of BFD RSs; that is, receiving the BFRR information on the TRP with the beam failure, where the BFRR information may be DCI for scheduling transmission; or receiving BFRR information based on any one piece of first object information corresponding to the measured BFD RSs, that is, receiving the BFRR information on any one TRP, where the BFRR information may be DCI for scheduling transmission.

As an optional implementation, after sending the BFRQ information, the terminal may reset beam information of other channels. A specific resetting process may be as follows:

based on new beam RS information reported in the BFRQ information, determining beam information of a channel corresponding to same first object information as the part of BFD RSs, and/or determining beam information of a channel corresponding to second object information.

For example, the UE may determine, based on the new beam RS information, beam information of channels on all cells, all physical cells, or all TRPs. For another example, in the resetting process, for a TRP with a beam failure, beam information of other channels of the TRP may be determined based on the new beam RS information reported in the BFRQ information. If the PUCCH resource is configured with a plurality of pieces of spatial relation information, only spatial relation information corresponding to the TRP with the beam failure may be determined based on the new beam RS information reported in the BFRQ information.

Optionally, the beam information determined in the foregoing resetting process may start at a time with an offset of a preset quantity (for example, K) of symbols after a time of reception of the BFRR information; and correspondingly ends at a time of reception of reconfiguration information, activation information, or indication information of the determined beam information.

Figure 2:
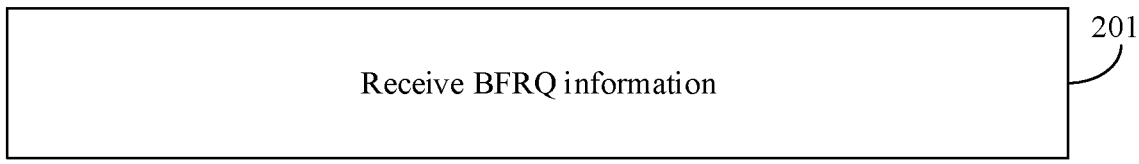
FIG. 2 is a flowchart of another beam failure recovery method according to an embodiment of the present invention.

Referring to FIG. 2, FIG. 2 is a flowchart of a beam failure recovery method according to an embodiment of the present invention. The method is applied to a network device. As shown in FIG. 2, the method includes the following steps.

Step 201: Receive BFRQ information sent by a terminal.

The BFRQ information is sent after the terminal determines a target event based on a measurement result of a BFD RS, and the BFD RS corresponds to a plurality of pieces of first object information.

In this embodiment of the present invention, a beam failure event in the multi-TRP scenario can be clarified, so as to quickly recover an interrupted beam link, thereby improving reliability of data transmission.

Optionally, the target event is that measurement results of all BFD RSs corresponding to a primary cell satisfy a first preset condition, and the step 201 includes:

receiving the BFRQ information that is sent by the terminal by using a contention-free RACH resource; or receiving the BFRQ information that is sent by the terminal by using a contention-based RACH resource.

Optionally, the receiving the BFRQ information that is sent by the terminal by using a contention-free RACH resource includes:

receiving the BFRQ information that is sent by the terminal based on target object information; where the target object information is determined by the terminal based on a target RACH resource and a correspondence between RACH resources and first object information.

Optionally, the target RACH resource corresponds to a target RS, or the target RACH resource and the target RS correspond to same first object information; and the target RS is determined based on measurement results of candidate beam RSs.

Optionally, the method further includes:

sending configuration information of the candidate beam RSs to the terminal, and/or sending RACH resource configuration information to the terminal; where the configuration information of the candidate beam RSs includes a correspondence between candidate beam RSs and first object information, and the RACH resource configuration information includes: a correspondence between RACH resources and first object information.

Optionally, after the receiving the BFRQ information that is sent by the terminal by using a contention-free RACH resource, the method further includes:

if one CORESET for BFR is configured for the terminal, sending BFRR information to the terminal on the CORESET; or if a plurality of CORESETs for BFR are configured for the terminal, sending BFRR information on a CORESET that corresponds to same target object information as the target RACH resource, or sending BFRR information on a CORESET that corresponds to same target object information as the target RS.

Optionally, the method further includes:

determining, based on beam information of the target RACH resource, beam information of a PUCCH corresponding to the target object information or second object information (that is, receiving the beam information); or based on the target RS, determining beam information of a PDCCH corresponding to the target object information or second object information, and/or determining beam information of a PDSCH corresponding to the target object information or second object information (that is, sending the beam information).

Optionally, the receiving the BFRQ information sent by the terminal by using the contention-based RACH resource includes: receiving the BFRQ information that is sent by the terminal based on the target object information.

The target object information is determined by the terminal based on a target RACH resource and a correspondence between RACH resources and first object information; the target RACH resource corresponds to a target SSB, or the target RACH resource and the target SSB correspond to same first object information; and the target SSB is determined based on terminal measurement.

Optionally, the method further includes: sending resource configuration information to the terminal.

The resource configuration information includes at least one of the following:

a correspondence between SSBs and first object information; and a correspondence between RACH resources and first object information.

Optionally, after the receiving the BFRQ information that is sent by the terminal by using a contention-based RACH resource, the method further includes:

sending BFRR information on CORESET #0.

Optionally, the method further includes:

based on the target SSB, determining beam information of a channel corresponding to the target object information or second object information, and/or determining beam information of an RS corresponding to the target object information or second object information.

Optionally, when the first object information is one of a TRP identifier, CORESETPoolIndex information, and a group identifier, the plurality of pieces of first object information is any one of the following cases:

belonging to a plurality of cells or a same cell; and belonging to a plurality of physical cells or a same physical cell.

Optionally, the target event is that measurement results of all BFD RSs corresponding to a secondary cell satisfy a second preset condition, and the receiving BFRQ information sent by a terminal includes:

receiving the BFRQ information that is sent by the terminal by using an uplink grant.

Optionally, when there is an available uplink grant, the uplink grant corresponds to any one piece of first object information.

Optionally, when there is no uplink grant, the method further includes:

receiving an SR; and sending a response to the terminal, where the response indicates the uplink grant, and the SR and the response correspond to same or different first object information.

Optionally, the receiving an SR includes any one of the following:

receiving the SR that is sent by the terminal based on third object information, where the third object information is determined based on a first correspondence;

receiving the SR that is sent by the terminal based on any one of the first object information; and receiving the SR that is sent by the terminal simultaneously or in turn based on the plurality of pieces of first object information; where the first correspondence includes any one of the following:

a correspondence between first object information and SR configuration information;

a correspondence between first object information and PUCCH resources for BFR in SR configuration information; and a correspondence between first object information and spatial relation information of PUCCH resources for BFR in SR configuration information.

Optionally, when no SR is configured for the terminal or the number of times of sending a configured SR reaches a preset threshold, the method further includes:

receiving a request that is sent by the terminal on a contention-based RACH resource in a primary cell; and sending a response to the terminal, where the response indicates the uplink grant.

Optionally, the contention-based RACH resource is determined based on a correspondence between SSBs and contention-based RACH resources after the terminal determines a target SSB through terminal measurement.

Optionally, the contention-based RACH resource and the target SSB correspond to same first object information.

Optionally, after the receiving the BFRQ information that sent by the terminal by using an uplink grant, the method further includes:

based on new beam RS information reported in the BFRQ information, determining beam information of a channel corresponding to target object information or the second object information.

Optionally, after the receiving the BFRQ information that sent by the terminal by using an uplink grant, the method further includes:

sending BFRR information to the terminal, where the BFRQ information and the BFRR information correspond to same or different first object information.

Optionally, the target event is that measurement results of part of BFD RSs satisfy a third preset condition, and the receiving BFRQ information sent by a terminal includes any one of the following:

receiving the BFRQ information that is sent by the terminal based on preset object information;

receiving the BFRQ information that is sent by the terminal by using a preset resource; and receiving the BFRQ information that is sent by the terminal by using a preset resource based on preset object information.

Optionally, the preset object information is any one of the following:

first object information corresponding to the part of BFD RSs;

first object information other than the first object information corresponding to the part of BFD RSs; and any one of the first object information corresponding to the measured BFD RSs.

Optionally, the preset resource is any one of the following:

a RACH resource; and an uplink resource for transmitting a MAC CE.

Optionally, when the preset resource is a RACH resource, the RACH resource is determined based on at least one of the following:

a correspondence between RACH resources and first object information;

new beam RS information; and target SSB information.

Optionally, when the preset resource is an uplink resource for transmitting the MAC CE, the receiving the BFRQ information that is sent by the terminal by using a preset resource includes:

receiving the BFRQ information that is sent by the terminal by using an uplink grant.

Optionally, when there is an available uplink grant, a priority of a first uplink grant is higher than a priority of a second uplink grant, the first uplink grant corresponds to first object information corresponding to the part of BFD RSs, and the second uplink grant corresponds to first object information other than the first object information corresponding to the part of BFD RSs.

Optionally, when the uplink grant is requested from the network by the terminal, the method further includes:

receiving an SR that is sent by the terminal based on a configured PUCCH resource for BFR; and sending a response to the terminal, where the response indicates the uplink grant, and the SR and the response correspond to same or different first object information.

Optionally, when no PUCCH resource for BFR is configured for the terminal, the method further includes:

receiving a request that is sent by the terminal using a contention-based RACH resource; and sending a response to the terminal, where the response indicates the uplink grant.

Optionally, the receiving an SR that is sent by the terminal based on a configured PUCCH resource for BFR includes:

receiving the SR that is sent by the terminal based on fourth object information, where the fourth object information is determined based on a second correspondence;

The second correspondence includes any one of the following:

a correspondence between first object information and SR configuration information;

a correspondence between first object information and PUCCH resources for BFR in SR configuration information; and a correspondence between first object information and spatial relation information of PUCCH resources for BFR in SR configuration information.

Optionally, after the receiving BFRQ information sent by a terminal, the method further includes:

sending BFRR information based on first object information corresponding to the part of BFD RSs; or sending BFRR information based on any one piece of first object information corresponding to the measured BFD RSs.

Optionally, after the receiving BFRQ information sent by a terminal, the method further includes:

based on new beam RS information reported in the BFRQ information, determining beam information of a channel corresponding to same first object information as the part of BFD RSs, and/or determining beam information of a channel corresponding to second object information.

The foregoing embodiment describes the beam failure recovery method in the present invention. The following describes the terminal and network device in the present invention with reference to the embodiments and the accompanying drawings.

Figure 3:
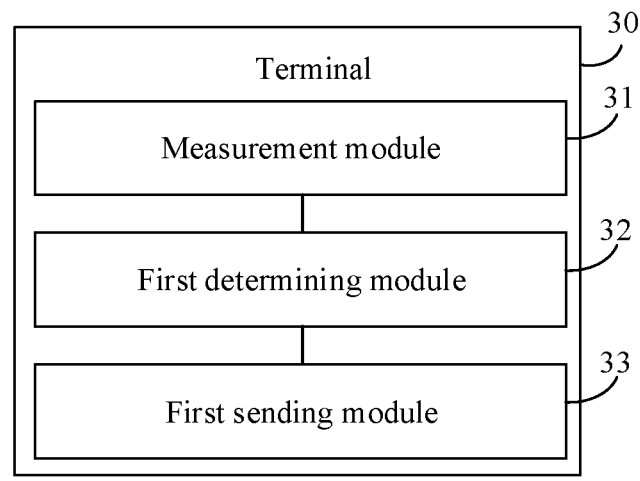
FIG. 3 is a first schematic structural diagram of a terminal according to an embodiment of the present invention.

Referring to FIG. 3, FIG. 3 is a schematic structural diagram of a terminal according to an embodiment of the present invention. As shown in FIG. 3, the terminal 30 includes:

a measurement module 31, configured to measure a BFD RS, where the BFD RS corresponds to a plurality of pieces of first object information, and the first object information includes at least one of the following: a transmission and reception point TRP identifier, CORESETPoolIndex information, a group identifier, a cell identity, and a PCI;

a first determining module 32, configured to determine a target event based on a measurement result of the BFD RS; and a first sending module 33, configured to send BFRQ information.

Optionally, the target event is that measurement results of all BFD RSs corresponding to a primary cell satisfy a first preset condition, and the first sending module 33 is specifically configured to:

send the BFRQ information by using a contention-free random access RACH resource; or send the BFRQ information by using a contention-based RACH resource.

Optionally, the first sending module 33 includes:

a first determining unit, configured to determine a target RACH resource; and determine, based on a correspondence between RACH resources and first object information, target object information corresponding to the target RACH resource; and a first sending unit, configured to send the BFRQ information based on the target object information.

Optionally, the first determining unit is specifically configured to:

measure candidate beam RSs, and determine a target RS based on measurement results of the candidate beam RSs; and determine, based on a correspondence between candidate beam RSs and RACH resources, the target RACH resource corresponding to the target RS; or select the target RACH resource based on the target RS, where the target RS and the target RACH resource correspond to same first object information.

Optionally, the configuration information of the candidate beam RSs includes: a correspondence between candidate beam RSs and first object information;

and/or, RACH resource configuration information of the terminal includes: a correspondence between RACH resources and first object information.

Optionally, the terminal 30 further includes:

a first monitoring module, configured to: when a control resource set CORESET for beam failure recovery BFR is configured, monitor BFRR information on the CORESET; or when a plurality of CORESETs for BFR are configured, monitor BFRR information on a CORESET that corresponds to same target object information as the target RACH resource, or monitor BFRR information on a CORESET that corresponds to same target object information as the target RS.

Optionally, the terminal 30 further includes:

a second determining module, configured to determine, based on beam information of the target RACH resource, beam information of a PUCCH corresponding to the target object information or second object information; or based on the target RS, determine beam information of a PDCCH corresponding to the target object information or second object information, and/or determine beam information of a PDSCH corresponding to the target object information or second object information; where the second object information includes at least one of the following: all cell identities, all PCIs, all TRP identifiers, all CORESETPoolIndex information, and all group identifiers.

Optionally, the determined beam information starts at a time after an offset with a preset quantity of symbols from the BFRR information reception; and the determined beam information ends at a time of reception of reconfiguration information, activation information, or indication information of the determined beam information.

Optionally, the first sending module 33 includes:

a second determining unit, configured to determine a target RACH resource; and a second sending unit, configured to determine, based on a correspondence between RACH resources and first object information, target object information corresponding to the target RACH resource, and send the BFRQ information based on the target object information.

Optionally, the second determining unit is specifically configured to:

determine a target SSB based on terminal measurement; and determine, based on a correspondence between SSBs and RACH resources, the target RACH resource corresponding to the target SSB; or select the target RACH resource based on the target SSB, where the target SSB and the target RACH resource correspond to same first object information.

Optionally, the resource configuration information of the terminal includes at least one of the following:

a correspondence between SSBs and first object information; and a correspondence between RACH resources and first object information.

Optionally, the terminal 30 further includes:

a second monitoring module, configured to monitor BFRR information on CORESET #0.

Optionally, the terminal 30 further includes:

a third determining module, configured to: based on the target SSB, determine beam information of a channel corresponding to the target object information or second object information, and/or determine beam information of an RS corresponding to the target object information or second object information.

Optionally, when the first object information is one of a TRP identifier, CORESETPoolIndex information, and a group identifier, the plurality of pieces of first object information is any one of the following cases:

belonging to a plurality of cells or a same cell; and belonging to a plurality of physical cells or a same physical cell.

Optionally, the target event is that measurement results of all BFD RSs corresponding to a secondary cell satisfy a second preset condition, and the first sending module 33 is specifically configured to:

when there is an available uplink grant, send the BFRQ information by using the uplink grant; or when there is no available uplink grant, send the BFRQ information by using an uplink grant requested from a network.

Optionally, when there is an available uplink grant, the uplink grant corresponds to any one piece of first object information.

Optionally, the first sending module 33 includes:

a first transceiver unit, configured to send an SR and receive a response sent by the network; and a third sending unit, configured to send the BFRQ information by using an uplink grant indicated by the response, where the SR and the response correspond to same or different first object information.

Optionally, the process of sending an SR includes any one of the following:

determining third object information based on a first correspondence, and sending the SR based on the third object information;

sending the SR based on any one of the first object information; and sending the SR simultaneously or in turn based on the plurality of pieces of first object information; where the first correspondence includes any one of the following:

a correspondence between first object information and SR configuration information;

a correspondence between first object information and PUCCH resources for BFR in SR configuration information; and a correspondence between first object information and spatial relation information of PUCCH resources for BFR in SR configuration information.

Optionally, if no SR is configured or the number of times of sending a configured SR reaches a preset threshold, the first sending module 33 is further configured to:

request the uplink grant from the network by using a contention-based RACH resource on a primary cell, and sending the BFRQ information by using the uplink grant.

Optionally, the contention-based RACH resource is determined based on a correspondence between SSBs and contention-based RACH resources after the terminal determines a target SSB through terminal measurement.

Optionally, the contention-based RACH resource and the target SSB correspond to same first object information.

Optionally, the terminal 30 further includes:

a fourth determining module, configured to: based on new beam RS information reported in the BFRQ information, determine beam information of a channel corresponding to target object information or second object information.

Optionally, the terminal 30 further includes:

a first receiving module, configured to receive BFRR information, where the BFRQ information and the BFRR information correspond to same or different first object information.

Optionally, the target event is that measurement results of part of BFD RSs satisfy a third preset condition, and the first sending module 33 is specifically configured to execute any one of the following:

sending the BFRQ information based on preset object information;

sending the BFRQ information by using a preset resource; and sending the BFRQ information by using a preset resource based on preset object information.

Optionally, the preset object information is any one of the following:

first object information corresponding to the part of BFD RSs;

first object information other than the first object information corresponding to the part of BFD RSs; and any one of the first object information corresponding to the measured BFD RSs.

Optionally, the preset resource is any one of the following:

a RACH resource; and an uplink resource for transmitting a medium access control control element MAC CE.

Optionally, when the preset resource is a RACH resource, the RACH resource is determined based on at least one of the following:

a correspondence between RACH resources and first object information;

new beam RS information; and target SSB information.

Optionally, when the preset resource is an uplink resource for transmitting the MAC CE, the process of sending the BFRQ information by using the preset resource specifically includes:

when there is an available uplink grant, sending the BFRQ information by using the uplink grant; or when there is no available uplink grant, sending the BFRQ information by using an uplink grant requested from a network.

Optionally, when there is an available uplink grant, a priority of a first uplink grant is higher than a priority of a second uplink grant, the first uplink grant corresponds to first object information corresponding to the part of BFD RSs, and the second uplink grant corresponds to first object information other than the first object information corresponding to the part of BFD RSs.

Optionally, the process of sending the BFRQ information by using an uplink grant requested from a network includes:

if a PUCCH resource for BFR is configured, sending the SR by using the PUCCH resource for BFR; and receiving a response sent by the network, and sending the BFRQ information by using an uplink grant indicated by the response, where the PUCCH resource and the response correspond to same or different first object information; or if no PUCCH resource for BFR is configured, requesting an uplink grant from the network by using a contention-based RACH resource, and sending the BFRQ information by using the requested uplink grant.

Optionally, where the sending the SR by using the PUCCH resource for BFR includes:

determining fourth object information based on a second correspondence, and sending the SR by using the PUCCH resource based on the fourth object information.

The second correspondence includes any one of the following:

a correspondence between first object information and SR configuration information;

a correspondence between first object information and PUCCH resources for BFR in SR configuration information; and a correspondence between first object information and spatial relation information of PUCCH resources for BFR in SR configuration information.

Optionally, the terminal 30 further includes:

a second receiving module, configured to: receive BFRR information based on first object information corresponding to the part of BFD RSs; or receiving BFRR information based on any one piece of first object information corresponding to the measured BFD RSs.

Optionally, the terminal 30 further includes:

a fifth determining module, configured to: based on new beam RS information reported in the BFRQ information, determining beam information of a channel corresponding to same first object information as the part of BFD RSs, and/or determining beam information of a channel corresponding to second object information.

Optionally, the BFRQ information includes at least one of the following:

first object information corresponding to the part of BFD RSs, and new beam RS information.

Optionally, the terminal may further execute at least one of the following:

monitoring CORESET #0 based on target object information;

changing an anchor (anchor) object based on the target object information; and based on CORESETPoolIndex information corresponding to the target object information, updating CORESETPoolIndex information corresponding to a CORESET that has been configured.

The terminal 30 in this embodiment of the present invention is capable of implementing the processes implemented in the method embodiment shown in FIG. 1, with the same beneficial effects achieved. To avoid repetition, details are not described herein again.

Figure 4:
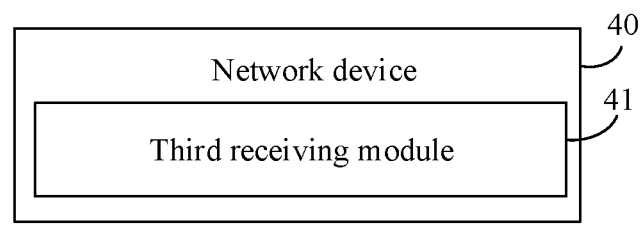
FIG. 4 is a first schematic structural diagram of a network device according to an embodiment of the present invention.

Referring to FIG. 4, FIG. 4 is a schematic structural diagram of a network device according to an embodiment of the present invention. As shown in FIG. 4, the network device 40 includes:

a third receiving module 41, configured to receive BFRQ information sent by a terminal; where the BFRQ information is sent after the terminal determines a target event based on measurement results of BFD RSs, the BFD RS corresponds to a plurality of pieces of first object information, and the first object information includes at least one of the following: a TRP identifier, CORESETPoolIndex information, a group identifier, a cell identity, and a PCI.

Optionally, the target event is that measurement results of all BFD RSs corresponding to a primary cell satisfy a first preset condition, and the third receiving module 41 is specifically configured to:

receive the BFRQ information that is sent by the terminal by using a contention-free RACH resource; or receive the BFRQ information that is sent by the terminal by using a contention-based RACH resource.

Optionally, the process of receiving the BFRQ information that is sent by the terminal by using a contention-free RACH resource includes:

receiving the BFRQ information that is sent by the terminal based on target object information; where the target object information is determined by the terminal based on a target RACH resource and a correspondence between RACH resources and first object information.

Optionally, the target RACH resource corresponds to a target RS, or the target RACH resource and the target RS correspond to same first object information; and the target RS is determined based on measurement results of candidate beam RSs.

Optionally, the network device 40 further includes:

a second sending module, configured to send configuration information of the candidate beam RSs to the terminal, and/or send RACH resource configuration information to the terminal; where the configuration information of the candidate beam RSs includes a correspondence between candidate beam RSs and first object information; and the RACH resource configuration information includes a correspondence between RACH resources and first object information.

Optionally, the network device 40 further includes:

a third sending module, configured to: if one CORESET for BFR is configured for the terminal, send BFRR information to the terminal on the CORESET; or when a plurality of CORESETs for BFR are configured for the terminal, send BFRR information on a CORESET that corresponds to same target object information as the target RACH resource, or send BFRR information on a CORESET that corresponds to same target object information as the target RS.

Optionally, the network device 40 further includes:

a sixth determining module, configured to determine, based on beam information of the target RACH resource, beam information of a PUCCH corresponding to the target object information or second object information; or based on the target RS, determine beam information of a PDCCH corresponding to the target object information or second object information, and/or determine beam information of a PDSCH corresponding to the target object information or second object information; where the second object information includes at least one of the following: all cell identities, all PCIs, all TRP identifiers, all CORESETPoolIndex information, and all group identifiers.

Optionally, the process of receiving the BFRQ information that is sent by the terminal by using a contention-based RACH resource includes:

receiving the BFRQ information that is sent by the terminal based on target object information; where the target object information is determined by the terminal based on a target RACH resource and a correspondence between RACH resources and first object information; the target RACH resource corresponds to a target SSB, or the target RACH resource and the target SSB correspond to same first object information; and the target SSB is determined based on terminal measurement.

Optionally, the network device 40 further includes:

a fourth sending module, configured to send resource configuration information to the terminal.

The resource configuration information includes at least one of the following:

a correspondence between SSBs and first object information; and a correspondence between RACH resources and first object information.

Optionally, the network device 40 further includes:

a fifth sending module, configured to send BFRR information on CORESET #0.

Optionally, the network device 40 further includes:

a seventh determining module, configured to: based on the target SSB, determine beam information of a channel corresponding to the target object information or second object information, and/or determine beam information of an RS corresponding to the target object information or second object information.

Optionally, when the first object information is one of a TRP identifier, CORESETPoolIndex information, and a group identifier, the plurality of pieces of first object information is any one of the following cases:

belonging to a plurality of cells or a same cell; and belonging to a plurality of physical cells or a same physical cell.

Optionally, the target event is that measurement results of all BFD RSs corresponding to a secondary cell satisfy a second preset condition, and the third receiving module 41 is specifically configured to:

receiving the BFRQ information that is sent by the terminal by using an uplink grant.

Optionally, when there is an available uplink grant, the uplink grant corresponds to any one piece of first object information.

Optionally, when there is no uplink grant, the network device 40 further includes:

a first transceiver module, configured to receive an SR, and send a response to the terminal, where the response indicates the uplink grant, and the SR and the response correspond to same or different first object information.

Optionally, the process of receiving an SR includes any one of the following:

receiving the SR that is sent by the terminal based on third object information, where the third object information is determined based on a first correspondence;

receiving the SR that is sent by the terminal based on any one of the first object information; and receiving the SR that is sent by the terminal simultaneously or in turn based on the plurality of pieces of first object information; where the first correspondence includes any one of the following:

a correspondence between first object information and SR configuration information;

a correspondence between first object information and PUCCH resources for BFR in SR configuration information; and a correspondence between first object information and spatial relation information of PUCCH resources for BFR in SR configuration information.

Optionally, when no SR is configured for the terminal or the number of times of sending a configured SR reaches a preset threshold, the first transceiver module is further configured to receive a request that is sent by the terminal on a contention-based RACH resource in a primary cell; and send a response to the terminal, where the response indicates the uplink grant.

Optionally, the contention-based RACH resource is determined based on a correspondence between SSBs and contention-based RACH resources after the terminal determines a target SSB through terminal measurement.

Optionally, the contention-based RACH resource and the target SSB correspond to same first object information.

Optionally, the network device 40 further includes:

an eighth determining module, configured to: based on new beam RS information reported in the BFRQ information, determine beam information of a channel corresponding to target object information or second object information.

Optionally, the network device 40 further includes:

a sixth sending module, configured to: send BFRR information to the terminal, where the BFRQ information and the BFRR information correspond to same or different first object information.

Optionally, the target event is that measurement results of part of BFD RSs satisfy a third preset condition, and the third receiving module 41 is specifically configured to execute any one of the following:

receiving the BFRQ information that is sent by the terminal based on preset object information;

receiving the BFRQ information that is sent by the terminal by using a preset resource; and receiving the BFRQ information that is sent by the terminal by using a preset resource based on preset object information.

Optionally, the preset object information is any one of the following:

first object information corresponding to the part of BFD RSs;

first object information other than the first object information corresponding to the part of BFD RSs; and any one of the first object information corresponding to the measured BFD RSs.

Optionally, the preset resource is any one of the following:

a RACH resource; and an uplink resource for transmitting a MAC CE.

Optionally, when the preset resource is a RACH resource, the RACH resource is determined based on at least one of the following:

a correspondence between RACH resources and first object information;

new beam RS information; and target SSB information.

Optionally, when the preset resource is an uplink resource for transmitting the MAC CE, the process of receiving the BFRQ information that is sent by the terminal by using a preset resource includes:

receiving the BFRQ information that is sent by the terminal by using an uplink grant.

Optionally, when there is an available uplink grant, a priority of a first uplink grant is higher than a priority of a second uplink grant, the first uplink grant corresponds to first object information corresponding to the part of BFD RSs, and the second uplink grant corresponds to first object information other than the first object information corresponding to the part of BFD RSs.

Optionally, when there is no uplink grant, the network device 40 further includes:

a second transceiver module, configured to receive an SR that is sent by the terminal based on a configured PUCCH resource for BFR, and send a response to the terminal, where the response indicates the uplink grant, and the SR and the response correspond to same or different first object information.

Optionally, when no PUCCH resource for BFR is configured for the terminal, the second transceiver module is further configured to: receive a request that is sent by the terminal using a contention-based RACH resource; and send a response to the terminal, where the response indicates the uplink grant.

Optionally, the process of receiving an SR that is sent by the terminal based on a configured PUCCH resource for BFR includes:

receiving the SR that is sent by the terminal based on fourth object information, where the fourth object information is determined based on a second correspondence.

The second correspondence includes any one of the following:

a correspondence between first object information and SR configuration information;

a correspondence between first object information and PUCCH resources for BFR in SR configuration information; and a correspondence between first object information and spatial relation information of PUCCH resources for BFR in SR configuration information.

Optionally, the network device 40 further includes:

a seventh sending module, configured to: send BFRR information based on first object information corresponding to the part of BFD RSs; or send BFRR information based on any one piece of first object information corresponding to the measured BFD RSs.

Optionally, the network device 40 further includes:

a ninth determining module, configured to: based on new beam RS information reported in the BFRQ information, determine beam information of a channel corresponding to same first object information as the part of BFD RSs, and/or determine beam information of a channel corresponding to second object information.

The network device 40 in this embodiment of the present invention is capable of implementing the processes implemented in the method embodiment shown in FIG. 2, with the same beneficial effects achieved. To avoid repetition, details are not described herein again.

An embodiment of the present invention further provides a communications device, including a processor, a memory, and a computer program stored in the memory and capable of running on the processor. When the computer program is executed by the processor, the processes of the foregoing embodiment shown in FIG. 1 or FIG. 2 are implemented, with the same technical effects achieved. To avoid repetition, details are not described herein again. The communications device is optionally a terminal or a network device.

Figure 5:
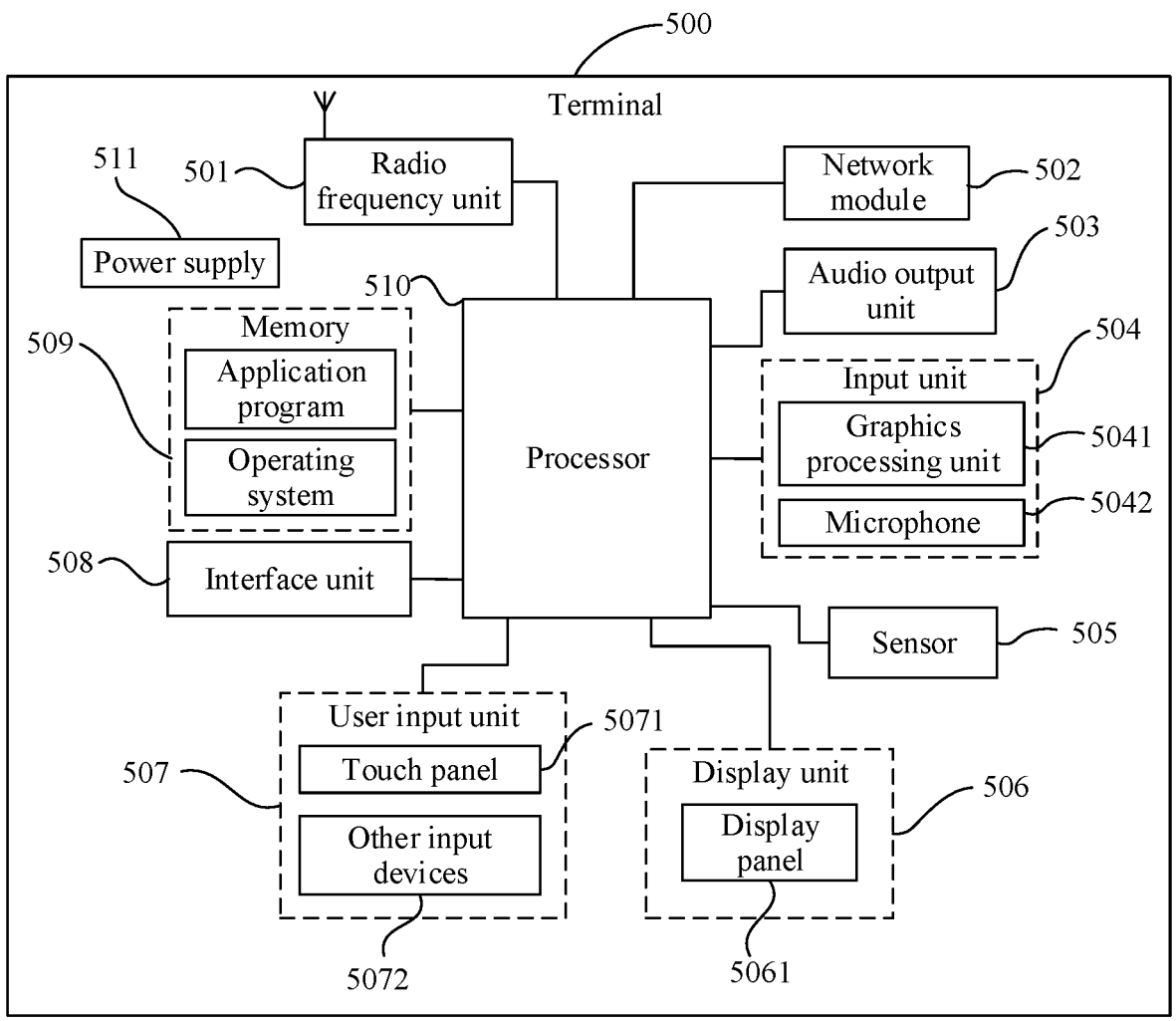
FIG. 5 is a second schematic structural diagram of a terminal according to an embodiment of the present invention.

Referring to FIG. 5, FIG. 5 is a schematic structural diagram of hardware of a terminal for implementing the embodiments of the present invention. The terminal 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that the structure of the terminal shown in FIG. 5 does not constitute any limitation on the terminal device. The terminal may include more or fewer components than those shown in the figure, or a combination of some components, or the components disposed differently. In this embodiment of the present invention, the terminal includes, but is not limited to, a mobile phone, a tablet computer, a laptop computer, a personal digital assistant, an in-vehicle terminal, a wearable device, a pedometer, and the like.

The processor 510 is configured to measure a BFD RS, and determine a target event based on a measurement result of the BFD RS, where the BFD RS corresponds to a plurality of pieces of first object information, and the first object information includes at least one of the following: a transmission and reception point TRP identifier, CORESET-PoolIndex information, a group identifier, a cell identity, and a PCI.

The radio frequency unit 501 is configured to send BFRQ information.

The terminal 500 in this embodiment of the present invention is capable of implementing the processes implemented in the method embodiment shown in FIG. 1, with the same beneficial effects achieved. To avoid repetition, details are not described herein again.

It should be understood that in this embodiment of the present invention, the radio frequency unit 501 may be configured to: receive and transmit signals in an information receiving/sending process or a call process; and specifically, after receiving downlink data from a base station, transmit the downlink information to the processor 510 for processing, and in addition, transmit uplink data to the base station. Generally, the radio frequency unit 501 includes but is not limited to an antenna, at least one amplifier, a transceiver, a coupler, a low noise amplifier, a duplexer, and the like. In addition, the radio frequency unit 501 may also communicate with a network and other devices via a wireless communications system.

The terminal provides a user with wireless broadband internet access through the network module 502, for example, helping the user to transmit and receive e-mails, browse web pages, and access streaming media.

The audio output unit 503 may convert audio data received by the radio frequency unit 501 or the network module 502 or stored in the memory 509 into an audio signal and output the audio signal as a sound. Furthermore, the audio output unit 503 may also provide audio output (for example, a call signal received sound or a message received sound) related to a specific function performed by the terminal 500. The audio output unit 503 includes a speaker, a buzzer, a receiver, and the like.

The input unit 504 is configured to receive an audio or video signal. The input unit 504 may include a graphics processing unit (Graphics Processing Unit, GPU) 5041 and a microphone 5042. The graphics processing unit 5041 processes image data of a still picture or a video obtained by an image capture apparatus (for example, a camera) in an image capture mode or a video capture mode. A processed image frame may be displayed on the display unit 506. The image frame processed by the graphics processing unit 5041 may be stored in the memory 509 (or another storage medium) or be transmitted by the radio frequency unit 501 or the network module 502. The microphone 5042 is capable of receiving sounds and processing such sounds into audio data. The processed audio data may be converted in a telephone call mode into a format that can be transmitted by the radio frequency unit 501 to a mobile communications base station, for outputting.

The terminal 500 further includes at least one sensor 505, for example, an optical sensor, a motion sensor, and other sensors. Specifically, the optical sensor may include an ambient light sensor and a proximity sensor. The ambient light sensor may adjust luminance of the display panel 5061 based on brightness of ambient light, and the proximity sensor may turn off the display panel 5061 and/or backlight when the terminal 500 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 505 may also include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information input by the user or information provided to the user. The display unit 506 may include a display panel 5061, and the display panel 5061 may be configured in a form of a liquid crystal display (Liquid Crystal Display, LCD), an organic light-emitting diode (Organic Light-Emitting Diode, OLED), or the like.

The user input unit 507 may be configured to: receive a digit or character information that is input, and generate signal input related to user settings and function control of the terminal. Specifically, the user input unit 507 may include a touch panel 5071 and other input devices 5072. The touch panel 5071 is also referred to as a touchscreen and can collect a touch operation (such as an operation performed by the user on the touch panel 5071 or near the touch panel 5071 with a finger or by using any proper object or accessory such as a stylus) of the user on or near the touch panel 5071. The touch panel 5071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 510, and can receive a command transmitted by the processor 510 and execute the command. In addition, the touch panel 5071 may be implemented in a plurality of forms, for example, as a resistive, capacitive, infrared, or surface acoustic wave touch panel. The user input unit 507 may further include the other input devices 5072 in addition to the touch panel 5071. Specifically, the other input devices 5072 may include but are not limited to a physical keyboard, a function key (such as a volume control key or an on/off key), a trackball, a mouse, and a joystick. Details are not described herein.

Further, the touch panel 5071 may cover the display panel 5061. When detecting a touch operation on or near the touch panel 5071, the touch panel 5071 transmits the touch operation to the processor 510 to determine a type of a touch event. Then, the processor 510 provides a corresponding visual output on the display panel 5061 based on the type of the touch event. In FIG. 5, the touch panel 5071 and the display panel 5061 serve as two independent components to implement input and output functions of the terminal. In some embodiments, however, the touch panel 5071 may be integrated with the display panel 5061 to implement the input and output functions of the terminal. This is not specifically limited herein.

The interface unit 508 is an interface between an external apparatus and the terminal 500. For example, the external apparatus may include a wired or wireless headphone port, an external power (or battery charger) port, a wired or wireless data port, a memory card port, a port for connecting an apparatus provided with a recognition module, an audio input/output (Input/Output, I/O) port, a video I/O port, an earphone port, and the like. The interface unit 508 may be configured to: receive input (for example, data information and power) from the external apparatus, and transmit the received input to one or more elements in the terminal 500, or may be configured to transmit data between the terminal 500 and the external apparatus.

The memory 509 may be configured to store software programs and various data. The memory 509 may mainly include a program storage area and a data storage area. The program storage area may store an operating system, and an application program required by at least one function (for example, a sound playback function or an image playback function). The data storage area may store data (for example, audio data or a phone book) created according to use of the mobile phone. In addition, the memory 509 may include a high-speed random access memory, and may further include a non-volatile memory such as at least one disk storage device, a flash memory device, or another volatile solid-state storage device.

The processor 510 is a control center of the terminal, and is connected to all components of the terminal by using various interfaces and lines. By running or executing a software program and/or module that is stored in the memory 509 and calling data stored in the memory 509, the processor 510 executes various functions of the terminal and processes data, so as to perform overall monitoring on the terminal. The processor 510 may include one or more processing units. Preferably, the processor 510 may integrate an application processor and a modem processor. The application processor mainly processes the operating system, a user interface, an application program, and the like. The modem processor mainly processes wireless communication. It can be understood that the modem processor may alternatively be not integrated in the processor 510.

The terminal 500 may further include the power supply 511 (such as a battery) supplying power to each component. Preferably, the power supply 511 may be logically connected to the processor 510 by using a power management system, so that functions such as charge and discharge management and power consumption management are implemented by using the power management system.

In addition, the terminal 500 may also include some functional modules that are not shown. Details are not described herein.

Figure 6:
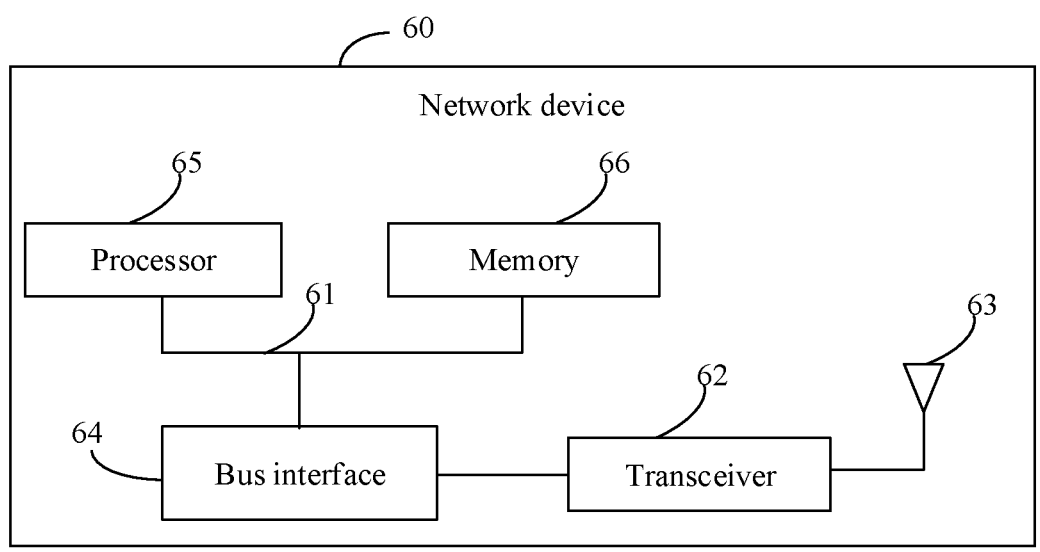
FIG. 6 is a second schematic structural diagram of a network device according to an embodiment of the present invention.

Referring to FIG. 6, FIG. 6 is a schematic structural diagram of hardware of a network device for implementing the embodiments of the present invention. The network device 60 includes a bus 61, a transceiver 62, an antenna 63, a bus interface 64, a processor 65, and a memory 66.

In this embodiment of the present invention, the network device 60 further includes a computer program stored in the memory 66 and capable of running on the processor 65. When the computer program is executed by the processor 65, the following steps are implemented:

receiving BFRQ information sent by a terminal; where the BFRQ information is sent after the terminal determines a target event based on measurement results of BFD RSs, the BFD RS corresponds to a plurality of pieces of first object information, and the first object information includes at least one of the following: a TRP identifier, CORESETPoolIndex information, a group identifier, a cell identity, and a PCI.

The transceiver 62 is configured to receive and transmit data under the control of processor 65.

The network device 60 in this embodiment of the present invention is capable of implementing the processes implemented in the method embodiment shown in FIG. 2, with the same beneficial effects achieved. To avoid repetition, details are not described herein again.

In FIG. 6, a bus architecture (represented by a bus 61), that is, the bus 61, may include any quantity of interconnected buses and bridges. The bus 61 connects one or more processors represented by the processor 65 to each circuit of a memory represented by a memory 66. The bus 61 may further connect a peripheral device and a voltage stabilizer to other circuits such as a power management circuit. This is known in the prior art, and the specification does not provide a further description. The bus interface 64 provides an interface between the bus 61 and the transceiver 62. The transceiver 62 may be one component or a plurality of components, for example, a plurality of transmitters and receivers, and provides units for communicating with a variety of other apparatuses on a transmission medium. Data processed by the processor 65 is transmitted over a wireless medium through the antenna 63. Further, the antenna 63 also receives data and transmits the data to the processor 65.

The processor 65 is responsible for managing the bus 61 and general processing, and provides various functions, including timing, peripheral interfaces, voltage regulation, power management, and other control functions. The memory 66 may be configured to store data that is used when the processor 65 performs an operation.

Optionally, the processor 65 may be CPU, ASIC, FPGA, or CPLD.

An embodiment of the present invention further provides a computer-readable storage medium, where a computer program is stored in the computer-readable storage medium. When the computer program is executed by a processor, the processes of the foregoing method embodiment shown in FIG. 1 or FIG. 2 can be implemented, with the same technical effects achieved. To avoid repetition, details are not described herein again. The computer-readable storage medium is, for example, a read-only memory (Read-Only Memory, ROM), a random access memory (Random Access Memory, RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially, or the part contributing to the related art, may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present invention.

A person of ordinary skill in the art may understand that all or some of the processes of the methods in the embodiments may be implemented by a computer program controlling relevant hardware. The program may be stored in a computer readable storage medium. When the program runs, the processes of the method embodiments may be included. The foregoing storage medium may be a magnetic disk, an optical disc, a read-only memory (Read-Only Memory, ROM), a random access memory (Random Access Memory, RAM), or the like.

It can be understood that the embodiments described in this disclosure may be implemented by hardware, software, firmware, middleware, microcode, or a combination thereof. For hardware implementation, a module, a unit, a sub-unit, a sub-module, and the like may be implemented in one or more application specific integrated circuits (Application Specific Integrated Circuit, ASIC), digital signal processors (Digital Signal Processor, DSP), digital signal processing devices (DSP Device, DSPD), programmable logic devices (Programmable Logic Device, PLD), field-programmable gate arrays (Field-Programmable Gate Array, FPGA), general-purpose processors, controllers, microcontrollers, microprocessors, and other electronic units for performing the functions described in this disclosure, or a combination thereof.

For software implementation, the techniques described in the embodiments of this disclosure may be implemented by modules (such as processes and functions) that perform the functions described in the embodiments of this disclosure. Software code may be stored in the memory and executed by the processor. The memory may be implemented in or outside the processor.

Some embodiments of the present invention have been described with reference to the attached drawings; however, the present invention is not limited to the aforesaid embodiments, and these embodiments are merely illustrative but are not intended to limit the present invention. Persons of ordinary skill in the art may further derive many other implementations according to the teachings of the present invention and within the scope defined in the claims, and all of the implementations shall fall within the scope of the present invention.

What is claimed is:

1. A beam failure recovery method, performed by a terminal and comprising:
    measuring a beam failure detection reference signal (BFD RS), wherein the BFD RS corresponds to a plurality of pieces of first object information, and the first object information comprises a physical cell identifier (PCI);
    determining a target event based on a measurement result of the BFD RS;
    wherein the target event is that measurement results of all BFD RSs corresponding to a primary cell satisfy a first preset condition, or, the target event is that measurement results of all BFD RSs corresponding to a secondary cell satisfy a second preset condition, or, the target event is that measurement results of part of BFD RSs satisfy a third preset condition; and
    sending beam failure recovery request (BFRQ) information.

2. The method according to claim 1, wherein after determining that the target event is that measurement results of all BFD RSs corresponding to the primary cell satisfy the first preset condition, and the sending BFRQ information comprises:
sending the BFRQ information by using a contention-free random access (RACH) resource, or
sending the BFRQ information by using a contention-based RACH resource;
wherein after determining that the target event is that measurement results of all BFD RSs corresponding to the secondary cell satisfy the second preset condition, and the sending BFRQ information comprises:
when there is an available uplink grant, sending the BFRQ information by using the uplink grant, or
when there is no available uplink grant, sending the BFRQ information by using an uplink grant requested from a network;
wherein after determining that the target event is that measurement results of part of BFD RSs satisfy the third preset condition, and the sending BFRQ information comprises any one of the following:
sending the BFRQ information based on preset object information;
sending the BFRQ information by using a preset resource; and
sending the BFRQ information by using a preset resource based on preset object information.

3. The method according to claim 2, wherein the sending the BFRQ information by using a contention-free RACH resource comprises:
determining a target RACH resource, and
determining, based on a correspondence between RACH resources and first object information, target object information corresponding to the target RACH resource, and sending the BFRQ information based on the target object information; or,
determining a target RACH resource, and
determining, based on a correspondence between RACH resources and first object information, target object information corresponding to the target RACH resource, and sending the BFRQ information based on the target object information.

4. The method according to claim 2, wherein when there is an available uplink grant, the uplink grant corresponds to any one of the first object information.

5. The method according to claim 2, wherein the sending the BFRQ information by using an uplink grant requested from a network comprises:
sending a scheduling request (SR); and
receiving a response sent by the network, and sending the BFRQ information by using an uplink grant indicated by the response, wherein the SR and the response correspond to same or different first object information.

6. The method according to claim 5, wherein the sending an SR comprises any one of the following:
determining third object information based on a first correspondence, and sending the SR based on the third object information;
sending the SR based on any one of the first object information; and
sending the SR simultaneously or in turn based on the plurality of pieces of first object information; wherein the first correspondence comprises any one of the following:
a correspondence between first object information and SR configuration information;
a correspondence between first object information and PUCCH resources for BFR in SR configuration information; and
a correspondence between first object information and spatial relation information of PUCCH resources for BFR in SR configuration information.

7. The method according to claim 2, wherein if no SR is configured or the number of times of sending a configured SR reaches a preset threshold, the sending the BFRQ information by using an uplink grant requested from a network comprises:
requesting the uplink grant from the network by using a contention-based RACH resource on a primary cell, and sending the BFRQ information by using the uplink grant.

8. The method according to claim 2, wherein the preset object information is any one of the following:
first object information corresponding to the part of BFD RSs;
first object information other than the first object information corresponding to the part of BFD RSs; and
any one of the first object information corresponding to the measured BFD RSs.

9. The method according to claim 2, wherein the preset resource is any one of the following:
a RACH resource; and
an uplink resource for transmitting a medium access control control element (MAC CE).

10. The method according to claim 9, wherein when the preset resource is an uplink resource for transmitting the MAC CE, the sending the BFRQ information by using a preset resource comprises:
when there is an available uplink grant, sending the BFRQ information by using the uplink grant; or
when there is no available uplink grant, sending the BFRQ information by using an uplink grant requested from a network.

11. The method according to claim 10, wherein when there is an available uplink grant, a priority of a first uplink grant is higher than a priority of a second uplink grant, the first uplink grant corresponds to first object information corresponding to the part of BFD RSs, and the second uplink grant corresponds to first object information other than the first object information corresponding to the part of BFD RSs.

12. The method according to claim 10, wherein the sending the BFRQ information by using an uplink grant requested from a network comprises:
if a PUCCH resource for BFR is configured, sending the SR by using the PUCCH resource for BFR; and
receiving a response sent by the network, and sending the BFRQ information by using an uplink grant indicated by the response, wherein the PUCCH resource and the response correspond to same or different first object information.

13. The method according to claim 12, wherein the sending the BFRQ information by using an uplink grant requested from a network further comprises:
if no PUCCH resource for BFR is configured, requesting an uplink grant from the network by using a contention-based RACH resource, and sending the BFRQ information by using the requested uplink grant.

14. The method according to claim 12, wherein the sending the SR by using the PUCCH resource for BFR comprises:

determining fourth object information based on a second correspondence, and sending the SR by using the PUCCH resource based on the fourth object information;

the second correspondence comprises any one of the following:

a correspondence between first object information and SR configuration information;

a correspondence between first object information and PUCCH resources for BFR in SR configuration information; and a correspondence between first object information and spatial relation information of PUCCH resources for BFR in SR configuration information.

15. The method according to claim 2, wherein after the sending BFRQ information, the method further comprises:

receiving BFRR information based on first object information corresponding to the part of BFD RSs; or receiving BFRR information based on any one piece of first object information corresponding to the measured BFD RSs.

16. The method according to claim 2, wherein after the sending BFRQ information, the method further comprises:

based on new beam RS information reported in the BFRQ information, determining beam information of a channel corresponding to same first object information as the part of BFD RSs, and/or determining beam information of a channel corresponding to second object information.

17. The method according to claim 2, wherein the BFRQ information comprises at least one of the following:

first object information corresponding to the part of BFD RSs, and new beam RS information.

18. The method according to claim 1, wherein after the determining a target event, the method further comprises at least one of the following:

monitoring CORESET #0 based on target object information;

changing an anchor object based on the target object information; and based on CORESETPoolIndex information corresponding to the target object information, updating CORESETPoolIndex information corresponding to a CORESET that has been configured.

19. A communications device, comprising a memory, a processor, and a computer program stored in the memory and capable of running on the processor, wherein when the computer program is executed by the processor, the steps of beam failure recovery method are implemented, wherein the method comprises:

measuring a beam failure detection reference signal (BFD RS), wherein the BFD RS corresponds to a plurality of pieces of first object information, and the first object information comprises a physical cell identifier (PCI);

determining a target event based on a measurement result of the BFD RS;

wherein the target event is that measurement results of all BFD RSs corresponding to a primary cell satisfy a first preset condition, or, the target event is that measurement results of all BFD RSs corresponding to a secondary cell satisfy a second preset condition, or, the target event is that measurement results of part of BFD RSs satisfy a third preset condition; and sending beam failure recovery request (BFRQ) information.

20. A communications device, comprising a memory, a processor, and a computer program stored in the memory and capable of running on the processor, wherein when the computer program is executed by the processor, the steps of beam failure recovery method are implemented, wherein the method comprises:

receiving BFRQ information sent by a terminal; wherein the BFRQ information is sent after the terminal determines a target event based on measurement results of BFD RSs, the BFD RS corresponds to a plurality of pieces of first object information, and the first object information comprises a physical cell identifier (PCI); wherein the target event is that measurement results of all BFD RSs corresponding to a primary cell satisfy a first preset condition, or, the target event is that measurement results of all BFD RSs corresponding to a secondary cell satisfy a second preset condition, or, the target event is that measurement results of part of BFD RSs satisfy a third preset condition.

\* \* \* \* \*